(12) United States Patent
Gupta

(10) Patent No.: US 8,769,495 B1
(45) Date of Patent: Jul. 1, 2014

(54) SYSTEMS AND METHODS FOR DEBUGGING IN A MULTIPROCESSOR ENVIRONMENT

(75) Inventor: Poorva Gupta, Cupertino, CA (US)

(73) Assignee: Sony Computer Entertainment Inc. (JP)

( * ) Notice: Subject to any disclaimer, the term of this patent is extended or adjusted under 35 U.S.C. 154(b) by 1822 days.

(21) Appl. No.: 11/541,983

(22) Filed: Oct. 2, 2006

Related U.S. Application Data

(60) Provisional application No. 60/722,506, filed on Sep. 30, 2005.

(51) Int. Cl.
*G06F 9/44* (2006.01)

(52) U.S. Cl.
USPC ........................................ 717/124; 714/38.14

(58) Field of Classification Search
None
See application file for complete search history.

(56) References Cited

U.S. PATENT DOCUMENTS

| | | | | |
|---|---|---|---|---|
| 4,980,857 A * | 12/1990 | Walter et al. | 714/45 |
| 5,630,049 A * | 5/1997 | Cardoza et al. | 714/25 |
| 5,819,093 A * | 10/1998 | Davidson et al. | 717/126 |
| 5,828,824 A * | 10/1998 | Swoboda | 714/25 |
| 5,933,639 A * | 8/1999 | Meier et al. | 717/129 |
| 6,058,393 A * | 5/2000 | Meier et al. | 717/124 |
| 6,158,045 A * | 12/2000 | You | 717/124 |
| 6,263,456 B1 * | 7/2001 | Boxall et al. | 714/31 |
| 6,490,721 B1 * | 12/2002 | Gorshkov et al. | 717/130 |
| 6,941,492 B1 * | 9/2005 | Ezra et al. | 714/38.13 |
| 7,133,820 B2 * | 11/2006 | Pennello et al. | 703/22 |
| 7,162,710 B1 * | 1/2007 | Edwards et al. | 717/111 |
| 7,353,498 B2 * | 4/2008 | Gupta et al. | 717/125 |
| 2001/0044929 A1 * | 11/2001 | Tsurugasaki | 717/4 |
| 2003/0004671 A1 * | 1/2003 | Minematsu | 702/123 |
| 2003/0110473 A1 * | 6/2003 | Kadlecik et al. | 717/128 |
| 2004/0010778 A1 * | 1/2004 | Kaler et al. | 717/130 |
| 2004/0054992 A1 * | 3/2004 | Nair et al. | 717/138 |
| 2004/0111707 A1 * | 6/2004 | Bliss et al. | 717/129 |
| 2005/0223359 A1 * | 10/2005 | Nagaraju et al. | 717/124 |
| 2005/0273652 A1 * | 12/2005 | Okawa et al. | 714/10 |

OTHER PUBLICATIONS

Dennis Doubleday "The Durra Application Debugger/Monitor", 1989, Software Engineering Institute, Carnegie Mellon University, CMU/SEI-89-TR-032, retrieved from: http://www.sei.cmu.edu/library/abstracts/reports/89tr032.cfm.*

Barbacci et al. "The Durra Runtime Environment", 1988, Software Engineering Institute, Carnegie Mellon University, CMU/SEI-88-TR-018, retrieved from: http://resources.sei.cmu.edu/asset_files/TechnicalReport/1988_005_001_15653.pdf.*

(Continued)

*Primary Examiner* — Jue Louie
(74) *Attorney, Agent, or Firm* — Lerner, David, Littenberg, Krumholz & Mentlik, LLP

(57) ABSTRACT

A method, system and apparatus for debugging in a multiprocessor environment. The system includes a principal processor which remotely debugs target programs running on a plurality of different target processors. The different types of target processors differ with respect to their instruction sets. The principal processor debugs the target programs and is configured to provide a plurality of debugging instructions specific to each instruction set, determine the type of target processor executing a target program to be debugged, select among the debugging instructions specific to each instruction set based upon the identified type of target processor, and insert the selected debugging instructions into the target program.

31 Claims, 4 Drawing Sheets

(56) References Cited

OTHER PUBLICATIONS

Barbacci et al. "Durra: A Task-Level Description Language Reference Manual (Version 2)", 1989, Software Engineering Institute, Carnegie Mellon University, CMU/SEI-89-TR-034, retrieved from: http://resources.sei.cmu.edu/asset_files/TechnicalReport/1989_005_001_15794.pdf.*

Barbacci et al. "Developing Applications for Heterogeneous Machine Networks: The Durra Environment", 1989, Computing Systems, vol. 2, No. 1.*

Barbacci et al. "Application-Level Programming", 1990, IEEE, pp. 458-465.*

* cited by examiner

SYSTEMS AND METHODS FOR DEBUGGING IN A MULTIPROCESSOR ENVIRONMENT

CROSS-REFERENCE TO RELATED APPLICATIONS

This application claims the benefit of the filing date of U.S. Provisional Patent Application No. 60/722,506 filed Sep. 30, 2005, the disclosure of which is hereby incorporated herein by reference.

BACKGROUND OF THE INVENTION

Multiprocessor devices use multiple processors to perform a variety of tasks. The tasks may all be related to the same program, or they may relate to different programs. For example, if the program is a game on racing, one task running on one processor may be responsible for calculating a car's speed and position while another task may be responsible for determining how to draw the three-dimensional car on a two-dimensional computer screen. It may be useful to break these two tasks into separate programs running in parallel because the car may be changing positions more often than the associated gaming device can display those positions. By running in parallel with access to some common memory, the two tasks can operate at independent speeds without affecting the performance of the other. As is known to those of ordinary skill in the art, a program may actually be a collection of programs relating to a particular application. For example, a racing game application may include either a racing program alone, or it may include both a racing program and a car-management program.

The multiple processors may be identical to one another (a homogeneous environment) or of different types (a heterogeneous environment). By way of example, in a heterogeneous environment, the processors may differ with respect to the set of microcode instructions that the processors are capable of executing.

Programmers typically use programs or routines called debuggers when writing programs for computers. Debuggers are used to assist programmers in preventing or remedying errors in applications, and they perform one or more of a variety of functions. For example, when a program is running, the debugger might allow a programmer to check on the data values (whether the values are stored in registers, RAM or any other memory) used by the program so that the programmer can examine potential anomalies (like a car whose position indicates the car is below the surface of the road). By further way of example, a debugger may allow a programmer to halt or break a running program at particular steps. The break may be absolute (e.g., whenever the processor encounters a break instruction) or conditional (e.g., whenever the memory associated with a car's altitude indicates that it is below the surface of the road). Other debugger functions will also be apparent to those of ordinary skill in the art.

When programs run on a computer with a relatively large amount of processing power and memory, such as many personal computers sold today, the debuggers often run on the same processor as the program they are debugging. However, there are instances where it is undesirable to run a debugger on the same processor as the program to be debugged.

For example, embedded systems such as personal digital assistants (PDAs) may have limited processing power to run both the debugger and the program to be debugged at the same time. Other systems such as gaming systems may have additional constraints, for example, the need to evaluate the performance of a game without hampering the performance of the game device by running a full debugger and game at the same time.

Heterogeneous multiprocessor environments provide additional challenges. The most effective debuggers are able to run natively on the same processor as the program to be debugged. Accordingly, when a multiprocessing system contains different types of processors, typical debuggers have required the user programmer to manually start, stop and manage multiple debuggers running at the same time even if the debuggers are shown in the same GUI. This can become extremely challenging when a program is simultaneously executing three or more processes on three or more different types of processors. The challenge is particularly difficult when the tasks of an application are relatively short-lived, that is, they may be spawned and terminated on a processor within a very short period of time.

Accordingly, there is a need for a system and method which permits a more advantageous debugging of programs in a heterogeneous multiprocessor environment.

SUMMARY OF THE INVENTION

The present application is directed to a method, system and apparatus for debugging in a multiprocessor environment.

One aspect of the present application comprises a method of remotely debugging, from a principal processor, target programs running on a plurality of different types of target processors whereby different types of target processors differ with respect to their instruction sets. The method comprises, at the principal processor, providing a plurality of debugging instructions specific to each instruction set, determining the type of target processor executing a target program to be debugged, selecting among the debugging instructions specific to each instruction set based upon the identified type of target processor, and inserting the selected debugging instructions into the target program.

In another aspect of the present application, a remote debugging system is disclosed which includes a principal processor and a plurality of different types of target processors each running a target program, wherein the different types of target processors differ with respect to their instruction sets. The principal processor is configured to debug the target programs where the functionality of the principal processor is described above with respect to the method aspect.

In yet another aspect of the present application, disclosed is a principal processor apparatus configured to debug the target programs where the functionality of the principal processor is described above with respect to the method aspect.

DESCRIPTION OF THE DRAWINGS

For the purposes of illustration, there are forms shown in the drawings that are presently preferred, it being understood, however, that the invention is not limited to the precise arrangements and instrumentalities shown.

DETAILED DESCRIPTION OF THE PREFERRED EMBODIMENTS

Figure 1:
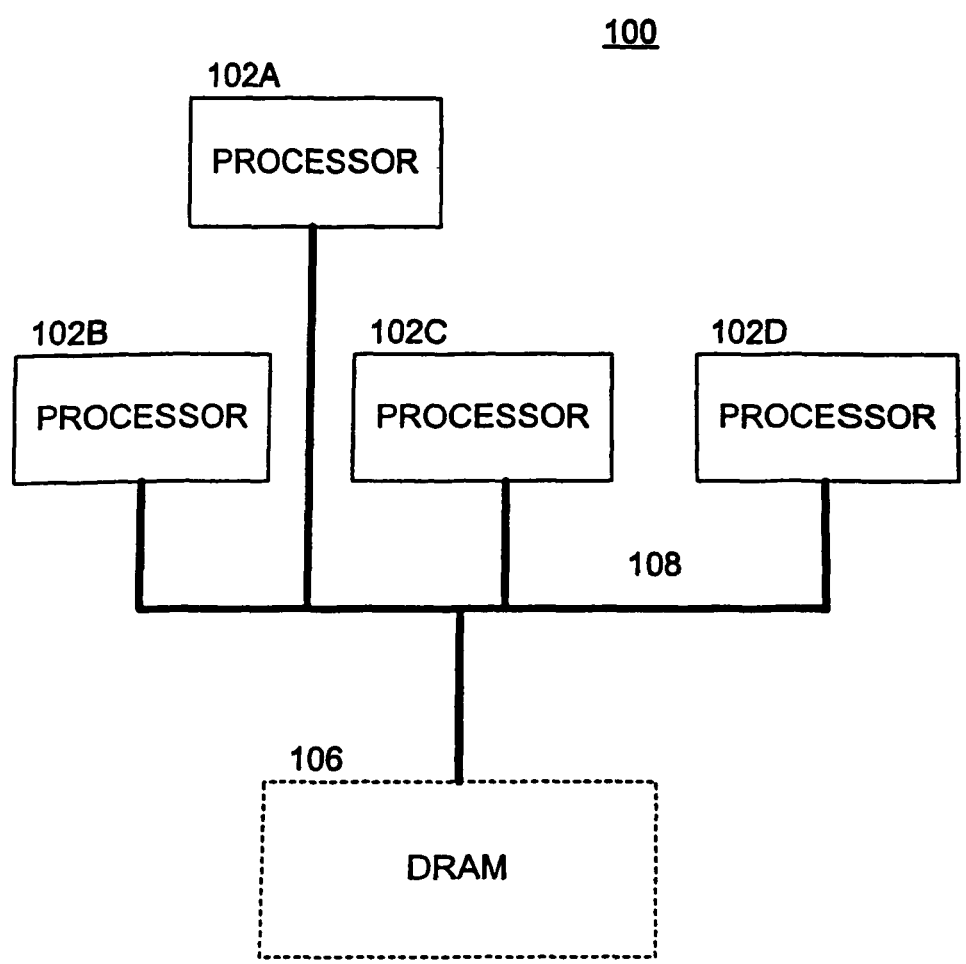
FIG. 1 is a diagram illustrating the structure of a multiprocessing system in accordance with one or more aspects of the present invention.

With reference to the drawings, where like numerals indicate like elements, there is shown in FIG. 1 a multiprocessing system 100 in accordance with the present invention. The multiprocessing system 100 includes a plurality of processors 102 (any number may be used) coupled to a shared memory 106, such as a DRAM, over a bus 108. It is noted that the shared DRAM memory 106 is not required (and thus is shown in dashed line). Indeed, one or more of the processing units 102 may employ its own memory (not shown) and have no need for the shared memory 106.

One of the processors 102 is preferably a main processing unit, for example, processing unit (PU) 102A. The other processing units 102 are preferably sub-processing units (SPUs), such as processing unit 102B, 102C, 102D, etc. The processing units 102 may be implemented using any of the known computer architectures. For the remainder of this specification, it shall be assumed that system is at least partially heterogeneous, that is, if the SPUs are identical, then PU is not identical to the SPUs. Alternatively, at least some of the SPUs may be heterogeneous with respect to one another.

In operation, the main processing unit 102A preferably schedules and orchestrates the processing of data and applications by the sub-processing units 102B-D such that the sub-processing units 102B-D perform the processing of these data and applications in a parallel and independent manner.

It is noted that the main processing unit 102A may be disposed locally with respect to the sub-processing units 102B-D, such as in the same chip, in the same package, on the same circuit board, in the same product, etc. Alternatively, the main processing unit 102A may be remotely located from the sub-processing units 102B-D, such as in different products, which may be coupled over a bus, a communications network (such as the Internet) or the like. Similarly, the sub-processing units 102B-D may be locally or remotely located from one another.

From time to time, one or more of the sub-processing units 102B-D may exhibit processor error. To this end, the main processing unit 102A is preferably operable to perform other managerial functions that permit the continuation of executing the processor tasks without having to re-execute the processor tasks that have been executed by the sub-processing unit 102B-D (prior to the error) from the beginning. Preferably, the managerial functions of the main processing unit 102A operate to ensure that real-time (and/or multi-media) processing objectives are met even in the event of a recoverable error in one or more of the sub-processing units 102B-D.

These further managerial functions include monitoring the processor tasks (and/or the associated processor loads for those tasks) that are allocated to be performed by the respective sub-processing units 102B-D. The main processing unit 102A may also detect whether a processing error has occurred in a given one of the sub-processing units, and re-allocate all of the processor tasks of the given sub-processing unit to one or more participating sub-processing units. This re-allocation is preferably carried out based on the processor loads of the processor tasks of the given sub-processing unit and the processor loads of the participating sub-processing units.

In accordance with a preferred computer architecture, all processors of a multiprocessing computer system are constructed from a common computing module (or cell). This common computing module has a consistent structure and preferably employs the same instruction set architecture among the SPUs although the PU has a different instruction set architecture.

The multiprocessing computer system can be formed of one or more clients, servers, PCs, mobile computers, game machines, PDAs, set top boxes, appliances, digital televisions and other devices using computer processors.

The basic processing module is a processor element (PE). In this regard, reference is made to FIG. 2, which is a block diagram of a basic processing module or processor element (PE) 200. As shown in this figure, PE 200 comprises an I/O interface 202, a processing unit (PU) 204, a direct memory access controller (DMAC) 206, and a plurality of sub-processing units 208, namely, sub-processing unit 208A, sub-processing unit 208B, sub-processing unit 208C, and sub-processing unit 208D. A local (or internal) PE bus 212 transmits data and applications among the PU 204, the sub-processing units 208, the DMAC 206, and a memory interface 210. The local PE bus 212 can have, e.g., a conventional architecture or can be implemented as a packet switch network. Implementation as a packet switch network, while requiring more hardware, increases available bandwidth.

The PE 200 can be constructed using various methods for implementing digital logic. The PE 200 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 200 also could be implemented using superconducting material, e.g., rapid single-flux-quantum (RSFQ) logic.

The PE 200 is closely associated with a dynamic random access memory (DRAM) 214 through a high bandwidth memory connection 216. The DRAM 214 functions as the main memory for the PE 200. Although the DRAM 214 preferably is a dynamic random access memory, the DRAM 214 could be implemented using other means, e.g., as a static random access memory (SRAM), a magnetic random access memory (MRAM), an optical memory, a holographic memory, etc. The DMAC 206 and the memory interface 210 facilitate the transfer of data between the DRAM 214 and the sub-processing units 208 and the PU 204 of the PE 200. It is noted that the DMAC 206 and/or the memory interface 210 may be integrally or separately disposed with respect to the sub-processing units 208 and the PU 204. Indeed, instead of a separate configuration as shown, the DMAC 206 function and/or the memory interface 210 function may be integral with one or more (preferably all) of the sub-processing units 208 and the PU 204.

The PU 204 can be, e.g., a standard processor capable of stand-alone processing of data and applications. In operation, the PU 204 schedules and orchestrates the processing of data and applications by the sub-processing units. The sub-processing units preferably are single instruction, multiple data (SIMD) processors. Under the control of the PU 204, the sub-processing units perform the processing of these data and applications in a parallel and independent manner. The DMAC 206 controls accesses by the PU 204 and the sub-processing units 208 to the data and applications stored in the shared DRAM 214. It is noted that the PU 204 may be implemented by one of the sub-processing units 208 taking on the role of a main processing unit that schedules and orchestrates the processing of data and applications by the sub-processing units 208.

In accordance with this modular structure, the number of PEs 200 employed by a particular computer system is based upon the processing power required by that system. For example, a server may employ four PEs 200, a workstation may employ two PEs 200 and a PDA may employ one PE 200. The number of sub-processing units of a PE 200 assigned to processing a particular software cell depends upon the complexity and magnitude of the programs and data within the cell. In an alternative configuration, the PE may include multiple PUs. Each of the PUs may include one or more SPUs.

Figure 3:
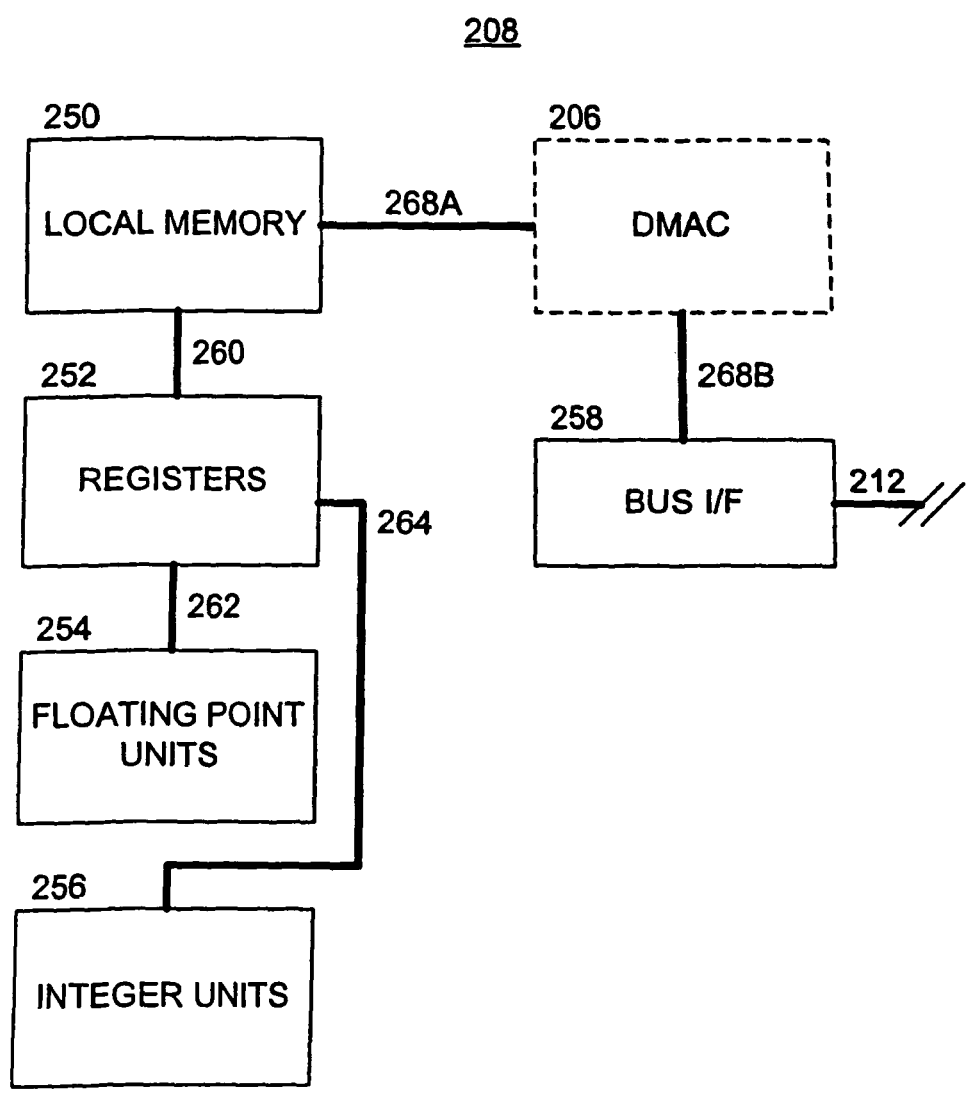
FIG. 3 is a diagram illustrating the structure of an exemplary sub-processing unit (SPU) in accordance with an aspect of the present invention.

FIG. 3 illustrates the preferred structure and function of a sub-processing unit 208. The sub-processing unit 208 includes local memory 250, registers 252, one or more floating point units 254 and one or more integer units 256. Preferably, each sub-processing unit 208 has its own unique local memory 250. Again, however, depending upon the processing power required, a greater or lesser number of floating points units 254 and integer units 256 may be employed. In a preferred embodiment, the local memory 250 contains 256 kilobytes of storage, and the capacity of registers 252 is 128×128 bits. The floating point units 254 preferably operate at a speed of 32 billion floating point operations per second (32 GFLOPS), and the integer units 256 preferably operate at a speed of 32 billion operations per second (32 GOPS).

The local memory 250 may or may not be a cache memory. The local memory 250 is preferably constructed as a static random access memory (SRAM). A PU 204 may require cache coherency support for direct memory accesses initiated by the PU 204. Cache coherency support is not required, however, for direct memory accesses initiated by the sub-processing units 208 or for accesses from and to external devices.

Figure 2:
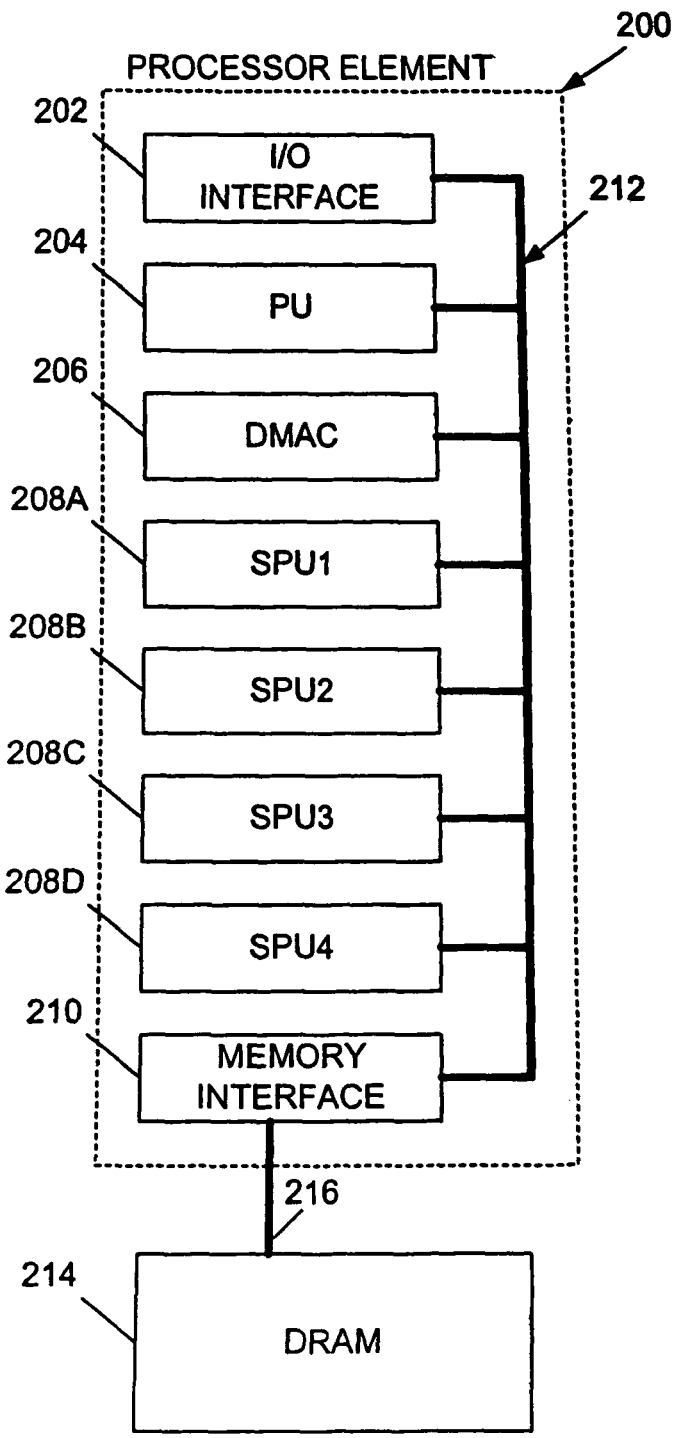
FIG. 2 is a diagram illustrating a preferred structure of a processor element (PE) in accordance with an aspect of the present invention.

The sub-processing unit 208 further includes a bus interface (I/F) 258 for transmitting applications and data to and from the sub-processing unit 208. In a preferred embodiment, the bus I/F 258 is coupled to a DMAC 206, which is shown in dashed line to indicate that it may be integrally disposed within the sub-processing unit 208 as shown or may be externally disposed (as shown in FIG. 2). A pair of busses 268A, 268B interconnect the DMAC 206 between the bus I/F 258 and the local memory 250. The busses 268A, 268B are preferably 256 bits wide.

The sub-processing unit 208 further includes internal busses 260, 262 and 264. In a preferred embodiment, the bus 260 has a width of 256 bits and provides communications between the local memory 250 and the registers 252. The busses 262 and 264 provide communications between, respectively, the registers 252 and the floating point units 254, and the registers 252 and the integer units 256. In a preferred embodiment, the width of the busses 264 and 262 from the registers 252 to the floating point or the integer units is 384 bits, and the width of the busses 264 and 262 from the floating point or the integer units 254, 256 to the registers 252 is 128 bits. The larger width of these busses from the registers 252 to the floating point or the integer units 254, 256 than from these units to the registers 252 accommodates the larger data flow from the registers 252 during processing. A maximum of three words are needed for each calculation. The result of each calculation, however, normally is only one word.

Further information relating to multiprocessing systems which may be used in connection with the current invention are described in U.S. Pat. No. 6,526,491, which is incorporated herein by reference with respect to its discussion of multiprocessing systems and any other disclosures.

In one aspect, the present invention provides a system and method for implementing debuggers in a heterogeneous multiprocessor environment such as, but not limited to, the one described above.

As is known to those of ordinary skill in the art, a remote debugger is such that some of the instructions (the "debugger stub") associated with debugging are executable by the processor executing the program to be debugged (the "target processor" and "target program"). However, the remainder or additional instructions associated with the debugger are executed on a different processor (the "principal debugger" and "principal debugger processor"). Remote debuggers are particularly useful when the target processor is incapable of running all of the debugger's instructions and target program at the same time. They are also useful when running all of the debugger's instructions and target program on the same processor would degrade the performance of the target program. For example, running a full debugger on the same processor as the task for rendering the image of a car may make it impossible to render the car's image as quickly as if the debugger were not present. Accordingly, the debugger might unfairly affect the performance or visual appearance of the racing application. Programs may be of any length and range from a few lines of code or a single routine, to large and complex applications. However, the invention is particularly advantageous when used with target programs that are part of the same application and at least occasionally share or use some of the same data.

An example of a system and operation of a remote debugger in the context of the present invention is described below and in connection with FIG. 4. It should be understood that the following operations do not have to be performed in the precise order described below. Rather, various steps can be handled in reverse order or simultaneously.

Multiprocessor element 200 runs a target application to be debugged. The target application comprises two target programs 412A and 412B to be executed on two different microprocessors 508A and 508B, respectively. The two microprocessors are heterogeneous with respect to one another as far as debugging is concerned. For example, the instruction sets 416A and 416B might have different break instructions and the user might need the ability to break at particular points in the program. The instruction sets might also have different instructions for reading register values, and the user might need the ability to read those register values during the processing of debugging.

The invention is not limited in terms in the types of target programs. For example, the target programs may comprise one program for determining a racing car's position and another program for rendering the car.

Even so, the invention is particularly advantageous with respect to architectures including a central PU which is heterogeneous with respect to the SPUs. Accordingly, and for ease of illustration, it shall be assumed for the remainder of this description that one of the target processors comprises PU 508A having an operating system 417 for managing and queuing tasks executed by the SPUs. The target program 412A executed by the PU 508A may comprise a program which creates the tasks and the target program 412B may comprise one of those tasks. For ease of illustration only, the remainder of this description shall continue to use this example.

The processor element 200 containing the target processor (PU 508A and SPU 508B) is in communication with principal debugger processor 450 via a communication link 480. The link may be implemented in any manner known to those of ordinary skill in the art. For example, signals may be communicated through I/O Interface 202 (see FIG. 2) of the processor element 200.

The principal debugger processor 450 includes one or more programs which monitor and debug the target programs 412A and 412B of the target application running on the processor element 200. The principal debugger processor 450 (see FIG. 4) may be, but is not limited to, a CPU of a personal computer. For example, the principal debugger processor 450 may comprise a collection of multiple processors and storage memories in a distributed environment.

In one of the possible aspects of the invention, the principal debugger processor 450 runs a principal debugger program 460. The principal debugger program 460 preferably monitors the creation or allocation of target programs to the target processors. The principal debugger program 460 may become aware of such creation or allocation in any number of ways, such as by listening to the operating system 417 via the communication link 480. Such functionality may also be built into the debugging stubs (discussed in more detail below) on the target processors.

It is also preferable for the principal debugger program 460 to perform those debugging functions that do not have to be executed by the target processor and those debugging functions which are not particular to the type of target processor. For example, the principal debugger program 460 may provide the GUI used by the debugger user and other complicated debugging functions. Portions of the principal debugger program 460 may be implemented by dynamically calling or incorporating code available from the widely-available "gdb" code. Portions of the principal debugger program 460 may also be implemented by the use of IBM's Eclipse tool platform.

When a target program is initiated on a target processor in a debugging environment, the principal debugger processor selects debugging instructions which are particular to the type of processor running the target program and causes the instructions to be executed on the target processor as a debugging stub. For example, the principal debugger may select a secondary debugger as described below.

By way of example only, when the target program 412A on PU 508A is initiated, operating system 417 provides a notification of the event which is received by principal debugger 460 via communication link 480. In response, the principal debugger 460 creates a secondary debugger 471A. The secondary debugger 417A disassembles the target program and then inserts any desired debugging instructions that are native to the target processor's instruction set 416A. The target program containing the debugging instructions is then loaded into the target processor. For example, if the user desires to unconditionally break at the 10th, 100th and 1000th instructions of the target program 412A, then the secondary debugger would load the target program 412A into the memory of the principal debugger processor 450 and then insert a break instruction after the 10th, 100th and 1000th instructions. The debugging instructions inserted by the secondary debugger 471A are shown as debugger stub 414A in FIG. 4.

The secondary debugger accommodates the instructions set of its associated target processors. For example, assume that the user desired to insert a conditional break. If the target processor's instruction set used a single microcode instruction and parameter to perform a conditional break, then the debugger stub would insert a break comprising a single instruction. However, if the target processor's instruction did not include a conditional break, then the debugger stub for that break may include two instructions, namely a conditional jump and a break such that the target program jumps around the break if the condition is not met. In that regard, the secondary debugger stub is native to the target processor and contains microcode instructions readable by target processor. Rather than discontinuous strings of single or multiple instructions, the various debugging functions operating on the target processor may also be stored in a single subroutine which is called, as appropriate, by the target program.

In addition to performing user-defined debugging events, the debugger stubs preferably include the ability to communicate with the secondary debugger 471A via virtual channel 481A. For example, the debugger stub 414A may send the values of the registers in PU 508A to secondary debugger 471A. The secondary debugger, in turn, provides the values to the primary debugger 460 along with the identity of the pending instruction of the target program, thus allowing the primary debugger to display and provide other user-interfaces to aid the programmer in tracing the target program. Methods of establishing remote debugging environments between a stub and target program on one processor (such as PU 508A) and additional debugging functionality (such as secondary debugger 471A) on another processor (such as principal debugger processor 450) will be apparent to those of ordinary skill in the art. However, it is also possible for the debugger stub to communicate information directly to the principal debugger if or when the information to be conveyed does not require an understanding of the target processor's particular instruction set.

In one of the possible aspects of the invention, the secondary debugger 471A is selected by spawning the secondary debugger from the principal debugger 460 and executing the secondary debugger as a new process on principal debugger processor 450. In such an aspect, the primary debugger would include all of the code necessary for communicating with the various types of target processors and the primary debugger 460 execs a copy of itself to act as secondary debugger 471B. In a UNIX environment, this may occur by the principal debugger calling a fork function, which creates a new child process and a process space for that child, as well as a pipe between the parent and child processes. The primary debugger then execs the secondary debugger 471B. The child establishes connections with the parent process and all its error messages; messages in and messages out go to the parent process. These processes typically do not share the same data and code space and run on the same processor. In other words, the principal debugger preferably creates a secondary debugger which acts as go-between between the principal debugger and the target program being debugged.

In one aspect of the possible aspects of the invention, the primary debugger 460 spawns a secondary debugger by creating another instance of the primary debugger. Moreover, when each secondary debugger is spawned, it may be loaded as an entirely new and separate process as compared to a thread sharing the same data and code space as the primary debugger. This increases the likelihood that each debugger can disassemble the entire target program without running into memory problems.

In another aspect, the secondary debuggers are not spawned from the principal debugger but, rather, are individually instantiated, such as individual instances of gdb that are particular to the target processor.

Although debugger stubs 414 as described above are particularly advantageous, other aspects of the invention are not limited to the foregoing. Moreover, the debugger stub may be implemented as a separately running thread from the target program if the target processor's architecture permitted multiple threads.

Moreover, the debugger stubs may perform more than the aforementioned functions. For example, the stubs may: read the register values of the target processor; read the local memory values of the target processor; temporarily or permanently halt execution of the target program either absolutely or conditionally; determine the most recent instruction of the target program that was executed; and communicate some or all of the foregoing information to and from the principal debugger processor 450, be it the principal debugger 460 or secondary debugger 471. The methods of communicating information may be accomplished via the use of write buffers. Preferably, in order to avoid loading unnecessary code into the debugger stub and thus the target processor, the primary debugger and secondary debuggers will perform most of the complex debugging calculations and functions.

When another target program 412B is loaded into SPU 508B, the process is repeated except this time a secondary debugger 471B will be created based on the instruction set 416B of SPU 508B rather than the instruction set 416A of PU 508A. For example, the secondary debugger 471B will be associated with SPU 508B's type of processor and will insert stub 414B into target processor 508B such that the stub 414B is readable by SPU 508B. Because SPU 508B is a different type of processor than PU 508A, the microcode instructions of debugger stub 414B will likely be different than the microcode instructions of debugger stub 414A even if they perform relatively the same functions. Debugger stub 414B will preferably include the ability to communicate with the secondary debugger 471B via virtual channel 481B.

Figure 4:
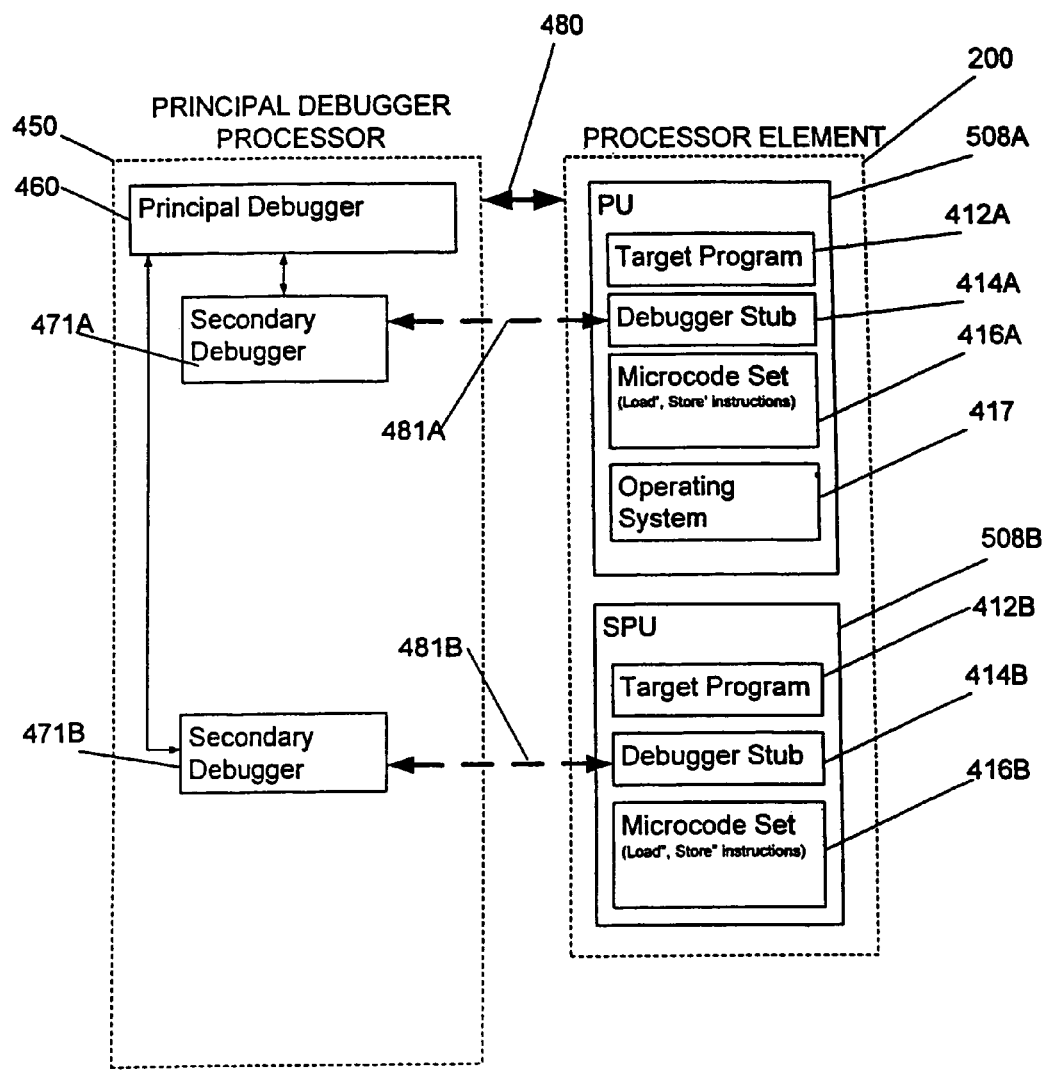
FIG. 4 is a functional diagram of an aspect of the present invention.

Although only two target processors 508A and 508B are shown in FIG. 4, it should be understood that processor element 200 may include any number of target processors and different types of processors. Accordingly, an advantage of one aspect of the present invention is its ability to accommodate any number of target processors and target processor types.

In one of the possible aspects of the invention, the principal debugger preferably includes data structures to identify the number of the active secondary debuggers, to identify the secondary debuggers associated with the target programs being debugged, and to identify similar information, thus enabling the principal debugger to act as a bookkeeper for the entire debugging environment. The principal debugger may also have a user-settable mechanism to stop debugging a certain process or even a certain processor. The user may also ask the principal debugger to ask one of the secondary debuggers to stop following a process.

In this manner, despite the fact that the system is comprised of different target processors, the same primary debugger may be used to manage the debugging of the various different target programs.

Preferably, there is one secondary debugger for each process of a target program. However, there may also be a single instance of a secondary debugger for each different type of target processor. While the various secondary debuggers may be directed to different types of target processors, the public properties and methods of the secondary debuggers are preferably substantially identical. Even so, the private encapsulated code of the secondary debuggers may differ substantially, depending on the type of the target processor with which the secondary debugger is communicating.

Many aspects of the present invention are advantageously flexible, robust and scalable. For example, debuggers built for debugging particular processors may be used with relatively few changes in a heterogeneous multiprocessor system by using the primary debugger to spawn processor-specific secondary debuggers. In some aspects, this allows the invention to be use a plug-and-play model allowing different debuggers for different multiprocessors to be used together.

One of the possible aspects of the invention also allows the primary debugger to inform the user when one of its associated secondary debuggers terminates, locks, or otherwise halts or fails to meaningfully progress, such as the result of a system crash or some other reason. In a UNIX environment, such capability can be implemented via the wait( ) or waitpid( ) functions. This allows for a very robust system, in that even if one of the secondary debuggers crashes, the remainder of the secondary debuggers may continue to run unaffected.

The method and system are also scalable. Because the primary and secondary debuggers are not a single process, a system operating in accordance with the invention is not necessarily limited by the memory constraints of a single process. Rather, each secondary debugger may have its own memory. Thus, any number of multiprocessors may be debugged. Accordingly, even if the processor element 200 has eight SPUs, it is not necessary to define the debugger to be able to debug eight processes. Rather, the required number of secondary debuggers can be spawned such that each runs in its own memory space and needs enough memory to debug just a single process. Having the secondary debuggers running remotely is especially advantageous when working with embedded systems having limited memory.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method of remotely debugging target programs running on a plurality of different types of target processors, the method comprising:
   providing, from a principal processor in communication with the plurality of target processors, a plurality of instruction set specific debugging instructions for a plurality of different instruction sets, wherein:
      each target processor of the plurality of target processors is a different type of processor relative to the principal processor and having a different instruction set;
      at least one of the target processors of the plurality of target processors is a main-processing unit and one or more of the target processors of the plurality of target processors are sub-processing units; and
      the main-processing unit monitors one or more tasks performed by the sub-processing units;
   executing, on the principal processor, a principal debugger;
   monitoring, by the principal debugger, an initiation of a target program of a shared application on a target processor of the plurality of target processors, wherein the shared application comprises a plurality of target programs that are only being executed by the plurality of target processors;
   communicating, from the principal debugger, with the target processor initiating the target program to determine the type of the target processor;
   selecting, by the principal debugger, debugging instructions from the plurality of instruction set specific debugging instructions based upon the identified type of the target processor, the selected debugging instructions are native to the instruction set of the target processor;
   creating, by the principal debugger, a secondary debugger for the target program; and
   inserting, by the secondary debugger, the selected debugging instructions into the target program.

2. The method of claim 1, wherein the principal debugger generates one or more secondary debuggers for respective target programs.

3. The method of claim 2, wherein at least one of the secondary debuggers is generated as an instance corresponding to a respective target program.

4. The method of claim 3, wherein at least one of the secondary debuggers is spawned in response to a signal from a respective target program.

5. The method of claim 3, wherein at least one of the secondary debuggers is executed as a new process on the principal processor.

6. The method of claim 3, wherein the principal debugger includes code for communicating with the different types of target processors.

7. The method of claim 3, wherein at least one of the secondary debuggers disassembles a respective target program and then inserts into the respective target program debugging instructions native to the target processor.

8. The method of claim 3, wherein the principal debugger communicates with a target program through information sent from the target program via a respective secondary debugger.

9. The method of claim 1, wherein each target program for each target processor of the plurality of target processors share some of the same data for the shared application.

10. A remote debugging system comprising:
   a plurality of target processors each running a target program, wherein:
      each target processor of the plurality of target processors has a different instruction set;
      at least one of the target processors of the plurality of target processors is a main-processing unit and one or more of the target processors of the plurality of target processors are sub-processing units;
      the main-processing unit monitors one or more tasks performed by the sub-processing units; and
   a principal processor, separate and different from each of the plurality of target processors, to remotely debug the target programs, wherein the principal processor is configured to:
      provide a plurality of instruction set specific debugging instructions for a plurality of different instruction sets;
      execute a principal debugger;
      monitor, by the principal debugger, an initiation of a target program of a shared application on a target processor of the plurality of target processors, wherein the shared application comprises a plurality of target programs that are only being executed by the plurality of target processors;
      communicating, from the principal debugger, with the target processor initiating the target program to determine the type of the target processor;
      select, by the principal debugger, debugging instructions from the plurality of instruction set specific debugging instructions based upon the identified type of the target processor, the selected debugging instructions are native to the instruction set of the target processor;
      creating, by the principal debugger, a secondary debugger for the target program; and
      insert, by the secondary debugger, the selected debugging instructions into the target program.

11. The system of claim 10, wherein at least one of the target processors has debugging instructions which execute as a thread separate from the target program.

12. The system of claim 10, wherein the main-processing unit is located remotely with respect to the sub-processing units.

13. The system of claim 10, wherein the main-processing unit is heterogeneous to the sub-processing units with respect to instruction sets.

14. The system of claim 10, wherein the main-processing unit is capable of detecting an error in a task performed by one of the sub-processing units and reallocating the task to another of the sub-processing units.

15. The system of claim 10, wherein the principal debugger generates one or more secondary debuggers for respective target programs.

16. The system of claim 15, wherein at least one of the secondary debuggers is generated as an instance corresponding to a respective target processor.

17. The system of claim 15, wherein at least one of the secondary debuggers is spawned in response to a signal from a respective target program.

18. The system of claim 15, wherein at least one of the secondary debuggers is executed as a new process on the principal processor.

19. The system of claim 10, wherein each target program for each target processor of the plurality of target processors share some of the same data for the shared application.

20. A principal processor apparatus capable of remotely debugging target programs running on a plurality of target processors, the principal processor apparatus comprising:
   a principal processor, separate from and in communication with a plurality of target processors, the principal processor configured to:
      provide a plurality of instruction set specific debugging instructions for a plurality of different instruction sets, wherein:
         each target processor of the plurality of target processors is a different type of processor relative to the principal processor and has a different instruction set;
         at least one of the target processors of the plurality of target processors is a main-processing unit and one or more of the target processors of the plurality of target processors are sub-processing units; and
         the main-processing unit monitors one or more tasks performed by the sub-processing units;
      executing, on the principal processor, a principal debugger;
      monitoring, by the principal debugger, an initiation of a target program of a shared application on a target processor of the plurality of target processors, wherein the shared application comprises a plurality of target programs that are only being executed by the plurality of target processors;
      communicate, from the principal debugger, with the target processor initiating the target program to determine the type of the target processor;
      select, by the principal debugger, debugging instructions from the plurality of instruction set specific debugging instructions based upon the identified type of the target processor, the selected debugging instructions are native to the instruction set of the target processor;
      creating, by the principal debugger, a secondary debugger for the target program; and
      insert, by the secondary debugger, the selected debugging instructions into the target program.

21. The apparatus of claim 20, wherein the principal debugger generates one or more secondary debuggers for respective target programs.

22. The apparatus of claim 21, wherein at least one of the secondary debuggers is generated as an instance corresponding to a respective target processor.

23. The apparatus of claim 21, wherein at least one of the secondary debuggers is spawned in response to a signal from a respective target program.

24. The apparatus of claim 21, wherein at least one of the secondary debuggers is executed as a new process on the principal processor.

25. The apparatus of claim 21, wherein the principal debugger includes code for communicating with the different types of target processors.

26. The apparatus of claim 21, wherein at least one of the secondary debuggers is an instance of the principal debugger and is loaded as a separate process than the principal debugger.

27. The apparatus of claim 21, wherein at least one of the secondary debuggers is a copy of the principal debugger and includes code for communicating with the different types of target processors.

28. The apparatus of claim 21, wherein at least one of the secondary debuggers communicates with a respective target program via the debugging instructions inserted into the target program.

29. The apparatus of claim 21, wherein at least one of the secondary debuggers accommodates the instruction set of its associated target processor.

30. The apparatus of claim 21, wherein at least one of the secondary debuggers disassembles a respective target program and then inserts into the respective target program debugging instructions native to the target processor.

31. The apparatus of claim 21, wherein each target program for each target processor of the plurality of target processors share some of the same data for the shared application.

\* \* \* \* \*